(12) United States Patent
Jarrett (10) Patent No.: US 7,977,280 B2
(45) Date of Patent: Jul. 12, 2011

(54) PROCESS FOR MINIMIZING BREAKING OF EMULSION TYPE DRILLING FLUID SYSTEMS, EMULSION TYPE DRILLING FLUID SYSTEMS, AND SPOTTING FLUIDS

(75) Inventor: Michael A. Jarrett, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 547 days.

(21) Appl. No.: 12/082,102

(22) Filed: Apr. 8, 2008

(65) Prior Publication Data

US 2008/0194429 A1    Aug. 14, 2008

Related U.S. Application Data

(63) Continuation-in-part of application No. 10/230,705, filed on Aug. 29, 2002, now abandoned.

(60) Provisional application No. 60/315,761, filed on Aug. 29, 2001.

(51) Int. Cl.
*C09K 7/00* (2006.01)

(52) U.S. Cl. ........ 507/100; 507/104; 507/204; 507/140; 507/906; 166/268

(58) Field of Classification Search .................. None
See application file for complete search history.

(56) References Cited

U.S. PATENT DOCUMENTS

| | | | |
|---|---|---|---|
| 2,212,108 A | 8/1940 | Zacher | |
| 2,749,309 A * | 6/1956 | Heritage | ........................ 507/104 |
| 2,877,180 A | 3/1959 | Park, et al. | |
| 3,022,249 A | 2/1962 | Eberhard | |
| 3,127,343 A | 3/1964 | Reddie, et al. | |
| 3,484,254 A | 12/1969 | Peterson, et al. | |
| 4,134,799 A * | 1/1979 | Allen et al. | ................. 205/793.5 |
| 4,191,254 A | 3/1980 | Baughman et al. | |
| 4,289,632 A | 9/1981 | Clear | |
| 4,369,844 A | 1/1983 | Clear | |
| 4,428,843 A | 1/1984 | Cowan et al. | |
| 4,439,328 A | 3/1984 | Moity | |
| 5,127,475 A * | 7/1992 | Hayes et al. | .................. 166/301 |
| 5,229,018 A | 7/1993 | Forrest | |
| 5,363,928 A | 11/1994 | Wittliff | |

(Continued)

FOREIGN PATENT DOCUMENTS

WO     WO-01-68787 A1     9/2001

(Continued)

OTHER PUBLICATIONS

Australian Patent and Trademark Office official Communication dated Dec. 21, 2006, Application No. 2002324824 [2 pages].

(Continued)

*Primary Examiner* — Randy Gulakowski
*Assistant Examiner* — Jeffrey Washville
(74) *Attorney, Agent, or Firm* — Paula Morris; The Morris Law Firm, P.C.

(57) ABSTRACT

A process for minimizing breaking of an emulsion type drilling fluid system comprising one or more fibrous lost circulation material, the process comprising: determining the water retention value of one or more candidate fibrous lost circulation materials; and, formulating the emulsion type drilling fluid system to comprise fibrous lost circulation material consisting of one or more of the candidate fibrous lost circulation materials having a water retention value of about 1 or less.

27 Claims, 2 Drawing Sheets

U.S. PATENT DOCUMENTS

| | | | |
|---|---|---|---|
| 5,801,127 A | | 9/1998 | Duhon, Sr. |
| 5,839,520 A | * | 11/1998 | Maillet .......................... 175/61 |
| 6,399,545 B1 | * | 6/2002 | Rose ............................ 507/104 |
| 6,400,149 B1 | | 6/2002 | Luong et al. |
| 6,436,234 B1 | * | 8/2002 | Chen et al. .................... 162/109 |
| 2002/0147113 A1 | | 10/2002 | Green |
| 2003/0158045 A1 | * | 8/2003 | Jarrett ........................... 507/100 |

FOREIGN PATENT DOCUMENTS

| | | |
|---|---|---|
| WO | WO-03-020845 A1 | 3/2003 |

OTHER PUBLICATIONS

Canadian patent and Trademark Office, Official Communication dated Oct. 30, 2007, Application No. 2459039, [3 pages].

United States Patent and Trademark Office (USPTO), First Office Action, Sep. 22, 2004, U.S. Appl. No. 10/230,705, [8 pages].

The Morris Law Firm, P.C. (MLF), Response to First Office Action, Nov. 5, 2004, U.S. Appl. No. 10/230,705, [34 pages].

USPTO, Final Office Action, Jan. 25, 2005, U.S. Appl. No. 10/230,705, [7 pages].

MLF, Response to Final Office Action, Mar. 14, 2005, U.S. Appl. No. 10/230,705, [23 pages].

USPTO, Advisory Action, Apr. 13, 2005, U.S. Appl. No. 10/230,705, [4 pages].

MLF, Request for Continued Examination (RCE) with Response to Advisory Action, Apr. 22, 2005, U.S. Appl. No. 10/230,705, [19 pages].

USPTO, First Office Action After RCE, Jul. 13, 2005, U.S. Appl. No. 10/230,705, [6 pages].

MLF, Response to First Office Action After RCE, Oct. 4, 2005, U.S. Appl. No. 10/230,705, [17 pages].

USPTO, Final Office Action After RCE, Dec. 7, 2005, U.S. Appl. No. 10/230,705, [7 pages].

MLF, Brief for Appellant, Mar. 8, 2006, U.S. Appl. No. 10/230,705, [29 pages].

USPTO Before The Board of Patent Appeals and Interferences (BPAI), Examiner's Answer, May 25, 2006, U.S. Appl. No. 10/230,705, [10 pages].

MLF, Reply Brief for Appellant, Jun. 28, 2006, U.S. Appl. No. 10/230,705, [23 pages].

USPTO BPAI, Order Returning Undocketed Appeal To Examiner, Oct. 25, 2006, U.S. Appl. No. 10/230,705, [3 pages].

USPTO, Notice of Non-Compliant Appeal Brief, Nov. 8, 2006, U.S. Appl. No. 10/230,705, [2 pages].

MLF, Transmittal of Amended Appeal Brief, Claims Appendix, Evidence Appendix, and Related Proceedings Appendix in Response to Notification of Non-Compliant Appeal Brief, Dec. 8, 2006, U.S. Appl. No. 10/230,705, [35 pages].

USPTO BPAI, Supplemental Examiner's Answer, Jun. 5, 2007, U.S. Appl. No. 10/230,705, [10 pages].

MLF, Supplemental Reply Brief for Appellant, Jul. 24, 2007, U.S. Appl. No. 10/230,705, [10 pages].

USPTO BPAI, Decision On Appeal, Feb. 27, 2008, U.S. Appl. No. 10/230,705, [10 pages].

Patent Cooperation Treaty (PCT), Notification of Transmittal of the International Search Report or the Declaration, Jan. 28, 2003, PCT/US02/27562, [7 pages].

MLF, Article 19 Amendments, Feb. 26, 2003, PCT/US02/27562, [9 pages].

PCT, Written Opinion, May 21, 2003, PCT/US02/27562, [7 pages].

MLF, Response to Written Opinion, Jul. 14, 2003, PCT/US02/27562, [28 pages].

PCT, International Preliminary Examination Report, Aug. 11, 2003, PCT/US02/27562, [22 pages].

Great Britain Patent Office (GBPO), Examination Report, Oct. 15, 2004, Application No. GB0405071.2, [3 pages].

GBPO, Examination Report, May 3, 2005, Application No. GB0405071.2, [2 pages].

GBPO, Combined Search and Examination Report, Sep. 12, 2005, Application No. GB0517179.8 [4 pages].

Frank B. Dehn & Co. (FBDC), Response to Combined Search and Examination Report, Nov. 4, 2005, Application No. GB0517179.8, [51 pages].

Frank B. Dehn & Co. (FBDC), Response to Communication dated Oct. 15, 2005, Apr. 20, 2005, Application No. GB0405071.2 (2396645) [13 pages].

FBDC, Response to Examination Report dated May 3, 2005, Aug. 18, 2005, Application No. GB0405071.2 (2396645), [60 pages].

* cited by examiner

PROCESS FOR MINIMIZING BREAKING OF EMULSION TYPE DRILLING FLUID SYSTEMS, EMULSION TYPE DRILLING FLUID SYSTEMS, AND SPOTTING FLUIDS

The present application is a continuation-in-part of U.S. application Ser. No. 10/230,705, filed Aug. 2, 2002 now abandoned, which claims the benefit of U.S. Provisional Application Ser. No. 60/315,761, filed Aug. 29, 2001.

FIELD OF THE INVENTION

The present application relates to processes for minimizing breaking of emulsion type drilling fluid systems which comprise one or more fibrous lost circulation material, or which contact one or more spotting fluid comprising one or more fibrous lost circulation material. The application also relates to emulsion type drilling fluid systems and to spotting fluids. As used herein, the phrase "emulsion type drilling fluid" refers to drilling, drill-in, and completion fluids.

BACKGROUND OF THE INVENTION

Certain subsurface conditions encountered during drilling operations can cause, or lead to, "loss of circulation," or the loss of whole drilling fluid in quantity to the formation. Examples of such subsurface conditions include, for example: (1) natural or intrinsic fractures, (2) induced or created fractures; (3) cavernous formations (crevices and channels), and (4) unconsolidated or highly permeable formations (loose gravels).

Lost circulation materials are used to minimize loss of circulation. The lost circulation material forms a filter cake that effectively blocks voids in the formation. Lost circulation materials include fibrous materials, such as cedar bark and shredded cane stalk, flaky materials such as mica flakes, and granular materials such as ground limestone, wood, nut hulls, corncobs, and cotton hulls. U.S. Pat. No. 6,399,545 to Rose describes "tannin-containing organic waste products," including "grape pomace, tomato pomace, beet pomace, yellow pine bark, yellow pine, wood bark and the like." Rose, col. 2,II. 64-66.

Unfortunately, low electrical stability values have been reported for invert emulsion drilling fluids containing fibrous cellulosic lost circulation material. If the electrical stability value of a drilling fluid becomes too low, water wetting of solids occurs, which may cause the rheological properties of the fluid to break down, rendering the drilling fluid ineffective and even resulting in a shutdown of drilling operations. For example, Rose acknowledges that the "use of certain cellulose materials is known to 'break' emulsions." Rose, col. 2, II. 11-12. Nevertheless, Rose does not describe a method for minimizing breaking of an emulsion type drilling fluid system comprising one or more fibrous lost circulation material.

Processes are needed to minimize breaking of emulsion type drilling fluid systems comprising one or more fibrous lost circulation material.

SUMMARY OF THE INVENTION

The present application provides a process for minimizing breaking of an emulsion type drilling fluid system comprising one or more fibrous lost circulation material comprising limiting the fibrous lost circulation material used in the emulsion type drilling fluid system to fibrous lost circulation materials selected from the group consisting of those having a water retention value of about 1 or less, and those for which the maximum predicted decrease in electrical stability voltage is 20% or less.

In one embodiment, the present application provides a process for minimizing breaking of an emulsion type drilling fluid system comprising one or more fibrous lost circulation material, the process comprising: determining the water retention value of one or more candidate fibrous lost circulation materials; and, formulating the emulsion type drilling fluid system to comprise fibrous lost circulation material consisting of one or more of the candidate fibrous lost circulation materials having a water retention value of about 1 or less. In one embodiment, the process minimizes breaking of an invert emulsion type drilling fluid system comprising one or more fibrous lost circulation material.

In one embodiment, the application provides a process for minimizing breaking of an emulsion type drilling fluid system in contact with a spotting pill comprising one or more fibrous lost circulation material, the process comprising: determining the water retention value of one or more candidate fibrous lost circulation materials; and, formulating the spotting pill to comprise fibrous lost circulation material consisting of one or more of the candidate fibrous lost circulation materials having a water retention value of about 1 or less.

In another embodiment, the application provides a process for minimizing breaking of an emulsion type drilling fluid system comprising one or more fibrous lost circulation material, the process comprising: determining the maximum predicted decrease in electrical stability voltage of the emulsion type drilling fluid system upon addition of a candidate fibrous lost circulation material; and, formulating the emulsion type drilling fluid system to comprise fibrous lost circulation material consisting of one or more candidate fibrous lost circulation materials for which the maximum predicted decrease in electrical stability voltage is 20% or less.

In yet another embodiment, the application provides a process for minimizing breaking of an emulsion type drilling fluid system in contact with a spotting pill comprising one or more fibrous lost circulation material, the process comprising: determining the maximum predicted decrease in electrical stability voltage of the emulsion type drilling fluid system upon addition of a candidate fibrous lost circulation material; and, formulating the spotting pill to comprise fibrous lost circulation material consisting of one or more candidate fibrous lost circulation materials for which the maximum predicted decrease in electrical stability voltage is 20% or less.

In one aspect, the application provides an emulsion type drilling fluid system having effective rheology and fluid loss control properties and comprising fibrous lost circulation material selected from the group consisting of bulrush plants and fibrous lignin byproducts from processing plant material into paper.

In one embodiment, the application provides a spotting pill comprising carrier fluid and consisting of fibrous lost circulation material having a water retention value of 1 or less.

In one embodiment, the application provides a spotting pill comprising carrier fluid and consisting of fibrous lost circulation material selected from the group consisting of grape pumice, bulrush plants, and fibrous lignin byproducts from processing plant material into paper.

In one embodiment, the application provides a spotting pill comprising carrier fluid and consisting of fibrous lost circulation material selected from the group consisting of bulrush plants and fibrous lignin byproducts from processing plant material into paper.

DETAILED DESCRIPTION OF THE INVENTION

Measurements of an emulsion-type drilling fluid are continually made in an effort to identify any loss in emulsion stability resulting from loss of circulation of the drilling fluid.

A preferred method of measuring emulsion stability in invert emulsion drilling fluids is to measure the electrical stability of the drilling fluid.

The electrical stability of an oil-based drilling fluid relates both to its emulsion stability and to its oil-wetting capability. Electrical stability of a drilling fluid is determined by applying a voltage-ramped, sinusoidal electrical signal across a pair of parallel flat-plate electrodes immersed in the drilling fluid. The resulting current remains low until a threshold voltage is reached, whereupon the current rises very rapidly. This threshold voltage is the electrical stability of the drilling fluid and is defined as the voltage in peak volts-measured when the current reaches 61 µA.

Field operators monitor the emulsion stability of a drilling fluid by reading the voltage across the drilling fluid. The resulting electrical stability reading is directly related to the ratio of water to oil in a particular drilling fluid. As the concentration of water in the drilling fluid increases, the electrical stability value tends to decrease.

The reported decrease in electrical stability values in invert emulsion drilling fluids appears to be attributable to swollen, hydrated fibers of lost circulation material that come into contact with the electrical stability meter probe. In order to preserve electrical stability (and thereby emulsion stability), water wetting of such fibrous materials must be minimized.

The type of lost circulation material added to a particular drilling fluid varies according to the primary purpose of the drilling operation; the nature of the rocks to be penetrated; the site, and the skill and experience of the drilling crew. Various plant source fibers are used as lost circulation materials. Cellulose is a major constituent of most plant cell walls, and also has a high affinity for water. Without limiting the application to a particular mechanism of action, the decrease in electrical stability of drilling fluids comprising many fibrous lost circulation materials is believed to be due to the intrinsic affinity of the cellulose in those fibers for water. In order to reduce the impact of a lost circulation material on electrical stability readings, the present application reduces the cellulosic content of the fibrous material.

Lignin also is found in plant cell walls. Lignin is a strengthening polymer which provides rigidity and strength to the plant material. Lignin does not have as great an affinity for water as cellulose. Plant materials with higher lignin contents should have a directly or indirectly proportional decrease in affinity for water. It is difficult to analyze plant materials directly to determine their lignin content.

The present application involves the use of "high lignin" lost circulation materials (HLLCM's) in drilling fluids. HLLCM's increase electrical stability values in emulsion type fluids, and thereby increase emulsion stability. "HLLCM's" are herein defined as fibrous lost circulation materials effective to maintain the electrical stability value of a given drilling, drill-in or completion fluid to within 20% or less of the electrical stability value of the same fluid in the absence of the HLLCM. Preferred HLLCM's are effective to maintain the electrical stability value of a given drilling, drill-in or completion fluid within 18% of the electrical stability value of the same fluid in the absence of the HLLCM, more preferably to within about 15%, and most preferably to within about 12%. Another way of stating the electrical stability limitation is that the addition of the HLLCM causes a maximum reduction in voltage reading of 20% or less relative to the initial voltage reading, more preferably about 18% or less, even more preferably about 15% or less, most preferably about 12% or less.

Suitable HLLCM's may be identified with reference to their "Water Retention Value" (WRV). A given plant material has a given hydration rate based on the size of voids within the fibers of that plant material. When the dry plant material is exposed to water, these voids are swollen by the water. The swelling of these voids in the presence of water may be measured, and the measured value is known as the material's WRV. The WRV is a measure of the amount of water intimately associated with a given dry weight of a given plant material, and is approximately equal to the total change in volume of the cell wall of the plant material.

The WRV for a given plant material may be calculated upon performing a simple test. Add 25 g test material to a glass jar. Mix 250 ml of deionized water with the test material. Shear the slurry at 3000 rpm for 5 min. Cap the glass jar roll 16 hr at 150° F. After cooling, pour the jar contents into an assembled Buchner funnel (using Whatman filter paper No. 41) fitted on a 2-liter Erlenmeyer flask, hooked to a vacuum pump. Filter for two hours maximum. Remove the Buchner funnel with test material from the flask and weigh. Calculate the WRV as follows:

(Buchner funnel with filter paper and retained wet test material minus Buchner funnel with wet paper) minus initial weight of dry test material (25 g). Resultant value then divided by initial weight of dry test material (25 g).

Fibrous lost circulation materials in current use have a calculated WRV of about 4 or more. HLLCM's that are suitable for use in the present application have a calculated WRV of 1 or less, preferably 0.5 or less, and more preferably 0.3 or less.

Examples of suitable HLLCM's include, but are not necessarily limited to plants that actually grow in water but tend to remain dry, such as bulrush plants, which include cattails, papyrus, and the like. Also suitable are lignin byproducts derived from the processing of wood or other plant materials into paper. The products made from such processes typically require high contents of cellulose, and lignin is processed out of the wood. The lignin typically is sold for sulfonation.

The HLLCM generally has a particle size distribution effective to form a filter cake and to block loss of circulation of the drilling fluid to the formation. Suitable particle size distributions generally are from about 10 µm to about 200 µm, preferably from about 15 µm to about 170 µm.

A most preferred HLLCM for use in the application is grape pumice. HLLCMs, preferably grape pumice, have the added advantage of inducing less impact upon rheological properties.

The HLLCM preferably is used in emulsion type drilling fluids, most preferably invert emulsion drilling fluids. However, HLLCM's are useful as a lost circulation materials in any type of drilling fluid, including water base fluids, natural or synthetic oil base fluids, oil-in-water emulsion fluids, and water-in-oil emulsion fluids.

In one embodiment, the HLLCM is included as an integral part of a drilling fluid, and/or added to a drilling fluid, as needed, during drilling operations. In one aspect, the application provides a process for minimizing breaking of an emulsion type drilling fluid system comprising one or more fibrous lost circulation material comprising limiting the fibrous lost circulation material used in the emulsion type drilling fluid system to one or more fibrous lost circulation materials selected from the group consisting of those having a water retention value of about 1 or less, and those for which the maximum predicted decrease in electrical stability voltage of the emulsion type drilling fluid system upon addition of the fibrous lost circulation material is 20% or less.

In one embodiment, the process comprises: determining the water retention value of one or more candidate fibrous lost circulation materials; and, formulating the emulsion type drilling fluid system to comprise fibrous lost circulation material consisting of one or more of the candidate fibrous lost circulation materials having a water retention value of about 1 or less.

In one embodiment, determining the water retention value of one or more candidate fibrous lost circulation materials comprises consulting one or more relevant publications to retrieve such information. In one embodiment, the one or more publications comprise U.S. Publication No.

20030158045, published Aug. 21, 2003, or U.S. application Ser. No. 10/230,705, filed Aug. 29, 2002.

In another embodiment, determining the water retention value of one or more candidate fibrous lost circulation materials comprises: forming a mixture comprising an initial weight of a candidate fibrous lost circulation material and a volume of water sufficient to hydrate the candidate fibrous lost circulation material; subjecting the mixture to conditions effective to produce a slurry comprising free water and hydrated candidate fibrous lost circulation material comprising retained water; separating free water from the slurry, leaving a weight of the hydrated candidate fibrous lost circulation material; determining the weight of retained water by subtracting the initial weight of the candidate fibrous lost circulation material from the weight of the hydrated candidate lost circulation material; and, dividing the weight of retained water by the initial weight of the candidate fibrous lost circulation material. In one embodiment, the conditions comprise about 1 g of test material per 10 ml of water. In one embodiment, the conditions comprise shearing and hot rolling the slurry. In one embodiment, the conditions comprise hot rolling the slurry at a temperature of about 150° F. for about 16 hours.

In one embodiment, the emulsion type fluid is formulated using one or more fibrous lost circulation materials which demonstrate that they maintain the electrical stability voltage of the fluid within a certain level.

In one aspect, the application provides a process for minimizing breaking of an emulsion type drilling fluid system comprising one or more fibrous lost circulation material, the process comprising: determining the maximum predicted decrease in electrical stability voltage of the emulsion type drilling fluid system upon addition of a candidate fibrous lost circulation material; and, formulating the emulsion type drilling fluid system to comprise fibrous lost circulation material consisting of one or more of the candidate fibrous lost circulation materials for which the maximum predicted decrease in electrical stability voltage is 20% or less.

In one embodiment, determining the maximum predicted decrease in electrical stability voltage of the emulsion type drilling fluid system upon addition of a candidate fibrous lost circulation material comprises consulting one or more relevant publications to retrieve such information. In one embodiment, the one or more publications comprise U.S. Publication No. 20030158045, published Aug. 21, 2003, or U.S. application Ser. No. 10/230,705, filed Aug. 29, 2002.

In one embodiment, determining the maximum predicted decrease in electrical stability voltage of the emulsion type drilling fluid system upon addition of a candidate fibrous lost circulation material comprises: measuring an initial electrical stability voltage of an initial emulsion type drilling fluid system before adding one or more candidate fibrous lost circulation material; and, measuring a final electrical stability voltage of the emulsion type drilling fluid system after adding the one or more candidate fibrous lost circulation material Where the HLLCM is used as an integral part of a drilling fluid, the quantity used is from about 0.1 pounds per barrel (ppb) to about 25 ppb, preferably from about 5 ppb to about 10 ppb. Where the HLLCM is added to the drilling fluid as needed during operation, the HLLCM is simply added to the mud pit with mixing, as needed. The quantity of HLLCM added will vary depending upon the extent of the loss in circulation. Typically, the quantity is from about 0.1 ppb to about 25 ppb or more.

Alternately, the HLLCM is added to the mud pit as a spotting pill. In one embodiment, the application provides a process for minimizing breaking of an emulsion type drilling fluid system in contact with a spotting pill comprising one or more fibrous lost circulation material. In this embodiment, the process comprises: determining the water retention value of one or more candidate fibrous lost circulation materials; and, formulating the spotting pill to comprise fibrous lost circulation material consisting of one or more of the candidate fibrous lost circulation materials having a water retention value of about 1 or less.

In yet another embodiment, the application provides a process for minimizing breaking of an emulsion type drilling fluid system in contact with a spotting pill comprising one or more fibrous lost circulation material. In this embodiment, the process comprises: determining the maximum predicted decrease in electrical stability voltage of the emulsion type drilling fluid system upon addition of a candidate fibrous lost circulation material; and, formulating the spotting pill to comprise fibrous lost circulation material consisting of one or more candidate fibrous lost circulation materials for which the maximum predicted decrease in electrical stability voltage is 20% or less.

Determining the water retention value of one or more candidate fibrous lost circulation materials and/or determining the maximum predicted decrease in electrical stability voltage of the emulsion type drilling fluid system are assessed as described above.

Where the HLLCM is added to the mud pit as a spotting pill, the HLLCM is added as a slurry, together with a small amount of a carrier liquid that is compatible with the fluid being treated.

A preferred slurry comprises from about 1 ppb to about 100 ppb HLLCM, preferably about 5 to about 50 ppb HLLCM. A most preferred spotting pill is from about 1 ppb to about 100 ppb grape pumice in a carrier fluid, preferably from about 5 to about 50 ppb grape pumice. Typically, after the HLLCM is spotted opposite the loss zone, it is desirable to pull into the casing and wait six to eight hours before continuing operations.

Drilling fluid systems comprising fibrous lost circulation materials generally are non-Newtonian fluids. Non-Newtonian fluids frequently exhibit plastic flow, in which the flowing behavior of the material occurs after the applied stress reaches a critical value or yield point (YP). The yield point of a drilling fluid system frequently is expressed in units of Newtons per square meter ($N/m^2$), Pascal (Pa), or pounds per 100 square feet$^2$ ($lb/100\ ft^2$). The yield point is a function of the internal structure of a fluid.

During drilling operations, once the critical value or yield point (YP) of the drilling fluid is achieved, the rate of flow or rate of shear typically increases with an increase in pressure, causing flow or shearing stress. The rate of flow change, known as plastic viscosity (PV), is analogous to viscosity in Newtonian fluids. In the drilling fluid system, yield points (YP) above a minimum value are desirable to adequately suspend solids, such as weighting agents, cuttings, etc.

In the laboratory, a drilling fluid system has an initial YP before aging and an initial PV before aging. Generally, reference to "aging" or to an "aged" treatment fluid means that the drilling fluid system is hot rolled for a period of about 12 hours or more. In one embodiment, the drilling fluid system is hot rolled for about 16 hours.

The conditions of aging may vary depending upon the composition of the drilling fluid system and expected temperatures to be encountered during the drilling operation. Generally, hot rolling occurs at temperatures of from about 49° C. (120° F.) to about 149° C. (300° F.). In one embodiment, aging occurs at temperatures of from about 49° C. (120° F.) to about 66° C. (150° F.). In one embodiment, aging occurs at a temperature of about 66° C. (150° F.).

An aged treatment fluid has a final YP and a final PV. The initial and final PV and YP of the aqueous base treatment fluid may be measured using any suitable viscometer at any temperature. In one embodiment, the initial and final PV and the YP are measured using a FANN 35 viscometer at 24° C. (75° F.). Generally, the final YP is acceptable if the mud exhibits sufficient suspension capability with respect to weighting agents after aging.

The aqueous base treatment fluid also exhibits an initial plastic viscosity (PV) and a final PV after aging. In one embodiment, the final PV is sufficiently low to guarantee pumpability of the fluid.

Where the drilling fluid system is water based, the pH of the drilling fluid system typically is 7 or more. In one embodiment, the pH of the drilling fluid system is greater than 7. In one embodiment, the treatment fluid has a pH of about 8 or more. In one embodiment, the drilling fluid system has a pH of about 11 or less. In one embodiment, the drilling fluid system has a pH of about 10.5 or less. In one embodiment, the drilling fluid system has a pH of about 10 or less. In one embodiment, the drilling fluid system has a pH of about 9 or less.

Whether used as a integral part of the drilling fluid, or in a spotting pill, certain HLLCM's, such as grape pumice, tend to increase the acidity of water base fluids. Hence, where the HLLCM is used in a water base fluid, it is preferred to add a sufficient quantity of a buffering agent to increase the pH to neutral, or about 7. Suitable buffering agents include but are not necessarily limited to soda ash, sodium bicarbonate, sodium hydroxide, lime, calcium hydroxide, and the like. A suitable amount of buffering agent is from about 0.1 lb to about 0.2 lb, preferably 0.1 lb, for every 10 lbs. HLLCM, preferably grape pumice.

Suitable carrier fluids for a spotting pill vary depending upon the fluid being treated. Where the fluid is a water base fluid, the carrier preferably will be aqueous. Where the fluid is an oil base fluid, the carrier preferably will be non-aqueous, and so forth. In a preferred embodiment, the carrier fluid is selected from the group consisting of glycols, polyglycols, polyalkyleneoxides, alkyleneoxide copolymers, alkylene glycol ethers, polyalkyleneoxide glycol ethers, and salts of any of the foregoing compounds, and combinations of the foregoing compounds.

Examples of suitable glycols and polyglycols include, but are not necessarily limited to ethylene glycols, diethylene glycols, triethylene glycols, tetraethylene glycols, propylene glycols, dipropylene glycols, tripropylene glycols, and tetrapropylene glycols. Examples of suitable polyalkyleneoxides and copolymers thereof include, but are not necessarily limited to polyethylene oxides, polypropylene oxides, and copolymers of polyethylene oxides and polypropylene oxides. Suitable polyalkyleneoxide glycol ethers include, but are not necessarily limited to polyethylene glycol ethers, polypropylene glycol ethers, polyethylene oxide glycol ethers, polypropylene oxide glycol ethers, and polyethylene oxide/polypropylene oxide glycol ethers. Preferred carriers are ethylene glycol, tripropylene glycol bottoms, and combinations thereof. A most preferred carrier is tripropylene glycol bottoms.

The application will be better understood with reference to the following Examples, which are illustrative only. In the examples, CHEK-LOSS® is a corn cob based LCM, available from Baker Hughes INTEQ; PHENO-SEAL® is a ground plastic resin material, available from Montello, Inc.; MUD-LINER is a paper based LCM, available from BCI Incorporated; LIQUID CASING is a peanut hull based LCM available from Liquid Casing, Incorporated; KWIK SEAL FINE is a blend of vegetable and polymer fibers available from Kelco Oilfield Group; and BAROFIBRE is an almond hull based LCM, available from Baroid/Halliburton.

EXAMPLE 1

Field operations personnel reported continuing problems of low electrical stability values for invert emulsion drilling fluids containing fibrous lost circulation material (LCM) additives. Although not identifying the specific additives, a report indicated that all fibrous materials lowered electrical stability values. However, HPHT fluid losses of the laboratory test muds showed no evidence of water. The criteria of absence of water in the HPHT filtrate was used as the preferred method of determining emulsion stability.

The following is an assessment of the effects of various LCM additives on electrical stability, rheological properties, and HPHT/PPA filtration control of synthetic-based fluids.

Equipment

1. Prince Castle mixer
2. Fann viscometer, Model 35A
3. Thermometer, dial, 0-220° F.
4. Balance with precision of 0.01 g
5. Sieves (conforming to ASTM E11 requirements)
6. Roller oven, 150-250±5° F. (66-121±3° C.)
7. Static aging oven
8. Wash bottle
9. Retsch grinding mill
10. Mortar and pestle
11. Spatula
12. Timer: interval, mechanical or electrical, precision of 0.1 minute
13. Jars (approximately 500 ml capacity) with sealing lids
14. Heating cup, OFI, 115 volt
16. Malvern Mastersizer Procedures The Following INTEQ Fluids Laboratory Procedures were used:

Recommended Practice Standard Procedure for Field Testing Oil-Based Drilling Fluids, API Recommended Practice 13B-2, Third Edition, February 1998, incorporated herein by reference.

Recommended Practice Standard Procedure for Field Testing Water-Based Drilling Fluids, API Recommended Practice 13B-1, Second Edition, September 1997, incorporated herein by reference.

Instrumentation Manual for Malvern Mastersizer

Specifically, after calibrating the equipment, a sample of the field mud was screened through a Marsh funnel. The screened sample was placed in a viscometer cup maintained at 50° C.±2° C. (120° F.±5° F.) and the temperature of the drilling fluid sample was measured. The electrode probe body was cleaned thoroughly by wiping with a clean paper towel. The towel was passed through the electrode gap a few times. The electrode probe was swirled in isopropanol. The electrode probe was cleaned and dried. The sample was hand stirred with the electrode probe for approximately 10 s to ensure that the composition and temperature of the drilling fluid sample was uniform. The electrode probe was positioned so that it did not touch the bottom or sides of the container. The electrode probe surfaces were completely covered by the sample. The voltage ramp test was begun using the procedure outlined in the electrical stability meter operating manual. The electrode probe was not moved during the voltage ramp test. At the conclusion of the voltage ramp test, the ES value displayed on the readout device was noted. The procedure was repeated to verify that the readings did not differ by more than 5%.

Ten pounds of each of the fibrous lost circulation materials indicated below were added to one barrel of the field mud, and the procedure outlined above was repeated to determine electrical stability. The following were the results:

TABLE 1

Comparative evaluation of CHEK-LOSS ® and BLEN-PLUG OM in field SYN-TEQ ® samples

Materials:

| | | | | | | | |
|---|---|---|---|---|---|---|---|
| SYN-TEQ (unknown LCM) Sample A, bbl | 1.0 | 1.0 | 1.0 | 1.0 | — | — | — |
| SYN-TEQ Sample B, bbl | — | — | — | — | 1.0 | 1.0 | 1.0 |
| CHEK-LOSS, Sample C, lb/bbl | — | 10 | — | — | — | 10 | — |
| BLEN-PLUG OM, Sample D, lb/bbl | — | — | 10 | — | — | — | 10 |
| Stirred 15 min Electrical stability, volt | 1290 | 1160 | 1040 | 1290 | 220 | 175 | 160 |

Rolled 16 hr, 150° F.
FANN 35 Properties:

| | | | | | | | |
|---|---|---|---|---|---|---|---|
| 600 rpm rdg, 120° F. | 145 | 233 | n/m | 145 | 54 | 70 | n/m |
| 300 rpm rdg | 82 | 131 | — | 82 | 30 | 39 | — |
| 200 rpm rdg | 61 | 95 | — | 61 | 21 | 28 | — |
| 100 rpm rdg | 38 | 58 | — | 38 | 13 | 17 | — |
| 6 rpm rdg | 10 | 14 | — | 10 | 3 | 4 | — |
| 3 rpm rdg | 8 | 11 | — | 8 | 2 | 3 | — |
| Plastic viscosity, cp | 63 | 102 | — | 63 | 24 | 31 | — |
| Yield point, lb/100 ft$^2$ | 19 | 29 | — | 19 | 6 | 8 | — |
| 10-sec gel, lb/100 ft$^2$ | 10 | 12 | — | 10 | 3 | 5 | — |
| 10-min gel, lb/100 ft$^2$ | 13 | 16 | — | 13 | 5 | 7 | — |
| Electrical stability, volt | 1150 | 350 | 330 | 1150 | 220 | 150 | 130 |
| 60-mesh screened | | √ | √ | | | | |
| Electrical stability, volt | — | 390 | 350 | — | | | |

Treatment:

| | | | | | | | |
|---|---|---|---|---|---|---|---|
| Baroid DrilTreat, lb/bbl | | 5.0 | 5.0 | 5.0 | — | | |
| INTOIL-S, lb/bbl | | — | — | — | 5.0 | | |
| Electrical stability, volt | | 1290 | 385 | 350 | 1290 | | |
| CHEK-LOSS, lb | | 10 | — | — | 10 | | |

Rolled 16 hr, 150° F.

| | | | | | | | |
|---|---|---|---|---|---|---|---|
| Electrical stability, volt | | 430 | | | 440 | | |
| 600 rpm rdg, 120° F. | | 205 | | | 222 | | |
| 300 rpm rdg | | 118 | | | 129 | | |
| 200 rpm rdg | | 87 | | | 95 | | |
| 100 rpm rdg | | 54 | | | 60 | | |
| 6 rpm rdg | | 14 | | | 15 | | |
| 3 rpm rdg | | 11 | | | 12 | | |
| Plastic viscosity, cp | | 87 | | | 93 | | |
| Yield point, lb/100 ft$^2$ | | 31 | | | 36 | | |
| 10-sec gel, lb/100 ft$^2$ | | 15 | | | 16 | | |
| 10-min gel, lb/100 ft$^2$ | | 18 | | | 19 | | |

TABLE 2

Comparative evaluation of a) wetting agents with CHEK-LOSS ® in a field ECO-FLOW and b) competitive fibrous LCM additives versus MIL-CARB ® or PHENO-SEAL

| | A: Wetting Agents with CHEK-LOSS | | | | | | B: Fibrous LCM versus MIL-CARB | | | | | | |
|---|---|---|---|---|---|---|---|---|---|---|---|---|---|

Materials:

| | | | | | | | | | | | | | |
|---|---|---|---|---|---|---|---|---|---|---|---|---|---|
| ECO-FLOW, Sample E, bbl | 1.0 | 1.0 | 1.0 | 1.0 | 1.0 | 1.0 | 1.0 | 1.0 | 1.0 | 1.0 | 1.0 | 1.0 | 1.0 |
| DRILTREAT, lb/bbl | — | — | 5.0 | — | — | — | — | — | — | — | — | — | — |
| INTOIL-S, lb/bbl | — | — | — | 5.0 | — | — | — | — | — | — | — | — | — |
| BIO-COTE ™, lb/bbl | — | — | — | — | 2.5 | — | — | — | — | — | — | — | — |
| OMNI-COTE ®, lb/bbl | — | — | — | — | — | 2.5 | — | — | — | — | — | — | — |
| CHEK-LOSS, lb/bbl | — | 10 | 10 | 10 | 10 | 10 | — | — | — | — | — | — | — |
| PHENO-SEAL, lb/bbl | — | — | — | — | — | — | 10 | — | — | — | — | — | — |
| LUBRA-SEAL, lb/bbl | — | — | — | — | — | — | — | 10 | — | — | — | — | — |
| BAROFIBRE, lb/bbl | — | — | — | — | — | — | — | — | 10 | — | — | — | — |
| MUD LINER, lb/bbl | — | — | — | — | — | — | — | — | — | 10 | — | — | — |

TABLE 2-continued

Comparative evaluation of a) wetting agents with CHEK-LOSS ® in a field ECO-FLOW and b) competitive fibrous LCM additives versus MIL-CARB ® or PHENO-SEAL

| | A: Wetting Agents with CHEK-LOSS | | | | | | B: Fibrous LCM versus MIL-CARB | | | | | | |
|---|---|---|---|---|---|---|---|---|---|---|---|---|---|
| LIQUID CASING, lb/bbl | — | — | — | — | — | — | — | — | — | — | 10 | — | — |
| ULTRASEAL, lb/bbl | — | — | — | — | — | — | — | — | — | — | — | 10 | — |
| MIL-CARB, lb/bbl | — | — | — | — | — | — | — | — | — | — | — | — | 10 |
| Stirred 15 min Rolled 16 hr, 150° F. Properties: | | | | | | | | | | | | | |
| 600 rpm rdg, 120° F. | 122 | 178 | 155 | 168 | 153 | 150 | 125 | 136 | 157 | 198 | 1 | 160 | 124 |
| 300 rpm rdg | 72 | 100 | 88 | 95 | 80 | 80 | 73 | 79 | 90 | 112 | 94 | 90 | 73 |
| 200 rpm rdg | 52 | 73 | 66 | 70 | 54 | 57 | 54 | 59 | 65 | 81 | 68 | 67 | 54 |
| 100 rpm rdg | 33 | 45 | 41 | 43 | 30 | 33 | 34 | 36 | 41 | 49 | 42 | 45 | 33 |
| 6 rpm rdg | 10 | 12 | 11 | 12 | 4 | 4 | 10 | 10 | 11 | 12 | 11 | 13 | 10 |
| 3 rpm rdg | 8 | 10 | 9 | 10 | 3 | 3 | 8 | 8 | 10 | 11 | 10 | 12 | 8 |
| Plastic viscosity, cp | 50 | 78 | 67 | 73 | 73 | 70 | 52 | 57 | 67 | 86 | 71 | 70 | 51 |
| Yield point, lb/100 ft$^2$ | 22 | 22 | 21 | 22 | 7 | 10 | 21 | 22 | 23 | 26 | 23 | 20 | 22 |
| 10-sec gel, lb/100 ft$^2$ | 11 | 12 | 12 | 12 | 4 | 4 | 11 | 11 | 12 | 13 | 12 | 12 | 11 |
| 10-min gel, lb/100 ft$^2$ | 14 | 15 | 15 | 16 | 6 | 9 | 14 | 15 | 14 | 16 | 15 | 15 | 14 |
| Electrical stability, volt | 1170 | 620 | 640 | 500 | 440 | 480 | 1170 | 720 | 850 | 500 | 650 | 750 | 1160 |
| HPHT (250° F.), ml | 10.8 | 11.2 | — | — | — | — | 10.0 | 10.6 | 11.6 | 10.8 | 10.2 | 10.8 | 10.0 |
| Water in filtrate | no | no | — | — | — | — | no | no | no | no | no | no | no |

TABLE 3

Effect of CHEK-LOSS ® on electrical and particle size

| Materials: | | | | | | | | | | | | |
|---|---|---|---|---|---|---|---|---|---|---|---|---|
| ISO-TEQ ®, bbl | — | — | 0.75 | 0.75 | 0.85 | 0.85 | 0.95 | 0.95 | 1.00 | 1.00 | 1.00 | 1.00 |
| OMNI-MUL ®, lb/bbl | — | — | 12 | 12 | 12 | 12 | 12 | 12 | 12 | 12 | — | — |
| Deionized Water, bbl | 1.00 | 1.00 | 0.25 | 0.25 | 0.15 | 0.15 | 0.05 | 0.05 | — | — | — | — |
| CHEK-LOSS ®, lb/bbl | — | 50 | — | 50 | — | 50 | — | 50 | — | 50 | — | 50 |
| Stirred 30 min Rolled 16 hr, 150° F. Properties: | | | | | | | | | | | | |
| Electrical stability, volt | <5 | <5 | 150 | 10 | 230 | 15 | 1100 | 95 | 2000 | 2000 | 2000 | 2000 |
| Particle Size Analyses by Malvern: | | | | | | | | | | | | |
| D (v, 0.1) | — | 17.9 | — | 23.6 | — | 36.8 | — | 16.4 | — | 17.9 | — | 15.1 |
| D (v, 0.5) | — | 64.5 | — | 84.3 | — | 95.2 | — | 70.3 | — | 60.7 | — | 65.6 |
| D (v, 0.9) | — | 142 | — | 204 | — | 203 | — | 169 | — | 137 | — | 175 |

TABLE 4

Evaluation of Other fibrous LCM additives as compared to CHEK-LOSS ®

| Materials: | | | | | | | |
|---|---|---|---|---|---|---|---|
| UNOCAL ECO-FLOW Field Sample (FSR 4341d), bbl | 1.0 | 1.0 | 1.0 | 1.0 | 1.0 | 1.0 | 1.0 |
| CHEK-LOSS, lb/bbl | — | 10 | — | — | — | — | — |
| Slurry Blend*, lb/bbl | — | — | 12.5 | — | — | — | — |
| LCM Blend**, lb/bbl | — | — | — | 10 | — | — | — |
| KWIK-SEAL Fine, lb/bbl | — | — | — | — | 10 | — | — |
| MASTERSEAL, lb/bbl | — | — | — | — | — | 10 | — |
| LCP***, lb/bbl | — | — | — | — | — | — | 10 |
| Stirred 30 min | | | | | | | |
| Rolled 16 hr, 150° F. | | | | | | | |
| Properties: | | | | | | | |
| Electrical stability, volt | 1470 | 700 | 740 | 880 | 1280 | 1300 | 970 |
| 600 rpm rdg, 120° F. | 126 | 175 | 128 | 166 | 134 | 137 | 150 |
| 300 rpm rdg | 72 | 100 | 70 | 95 | 77 | 77 | 85 |
| 200 rpm rdg | 53 | 78 | 50 | 70 | 58 | 57 | 60 |
| 100 rpm rdg | 32 | 49 | 31 | 42 | 37 | 36 | 37 |
| 6 rpm rdg | 8 | 12 | 8 | 11 | 10 | 10 | 10 |
| 3 rpm rdg | 7 | 10 | 7 | 10 | 8 | 8 | 8 |
| Plastic viscosity, cp | 54 | 75 | 58 | 71 | 57 | 60 | 65 |
| Yield point, lb/100 ft$^2$ | 18 | 25 | 12 | 24 | 20 | 17 | 20 |
| 10-sec gel, lb/100 ft$^2$ | 10 | 11 | 9 | 13 | 12 | 11 | 12 |
| 10-min gel, lb/100 ft$^2$ | 13 | 15 | 11 | 15 | 14 | 14 | 14 |
| HPHT (250° F.), cm$^3$/30 min | 2.0 | 2.4 | — | — | 2.4 | 2.0 | — |
| Water in Filtrate? | no | no | — | — | no | no | — |

Notes:
*Slurry blend prepared by mixing 0.86 bbl ISO-TEQ ®, 12 lb/bbl OMNI-COTE ® and 125 lb/bbl CHEK-LOSS ®; added 12 lb/bbl of slurry (equivalent to 10 lb/bbl CHEK-LOSS) to base mud.
**LCM blend prepared by mixing 60% by weight MIL-GRAPHITE, 35% CHEK-LOSS ®, 2.5% WITCO 90 FLAKE and 2.5% INDUSTRENE R FLAKE.
***LCP supplied by Environmental Drilling Technology (Tulsa, OK).

TABLE 5

Performance of KWIK-SEAL Fine compared to CHEK-LOSS ® Coarse

| Materials: | | | | | |
|---|---|---|---|---|---|
| UNOCAL ECO-FLOW Field Sample (FSR 4341d), bbl | 1.0 | 1.0 | 1.0 | 1.0 | 1.0 |
| CHEK-LOSS ® Coarse, lb/bbl | — | 10 | — | — | — |
| CHEK-LOSS ® Coarse Retsch ground*, lb/bbl | — | — | 10 | — | — |
| KWIK-SEAL Fine, lb/bbl | — | — | — | 10 | — |
| KWIK-SEAL Fine Retsch ground*, lb/bbl | — | — | — | — | 10 |
| Stirred 30 min | | | | | |
| Rolled 16 hr, 150° F. | | | | | |
| Properties: | | | | | |
| Electrical stability, volt | 1470 | 900 | 580 | 1280 | 1100 |
| 600 rpm rdg, 120° F. | 126 | 150 | 160 | 134 | 145 |
| 300 rpm rdg | 72 | 85 | 90 | 77 | 83 |
| 200 rpm rdg | 53 | 63 | 67 | 58 | 61 |
| 100 rpm rdg | 32 | 38 | 41 | 37 | 37 |
| 6 rpm rdg | 8 | 12 | 12 | 10 | 11 |
| 3 rpm rdg | 7 | 11 | 11 | 8 | 10 |
| Plastic viscosity, cp | 54 | 65 | 70 | 57 | 62 |
| Yield point, lb/100 ft$^2$ | 18 | 20 | 20 | 20 | 21 |
| 10-sec gel, lb/100 ft$^2$ | 10 | 12 | 12 | 12 | 12 |
| 10-min gel, lb/100 ft$^2$ | 12 | 14 | 16 | 14 | 14 |
| Particle Size Analyses of Ground LCM additives by Malvern: | | | | | |
| D (v, 0.1) | | | | 12.96 | 15.11 |
| D (v, 0.5) | | | | 100.9 | 99.4 |
| D (v, 0.9) | | | | 335.8 | 369 |

Notes:
*LCM additives ground by Retsch apparatus

TABLE 6

PPA STUDY - Evaluation of KWIK-SEAL ® Fine compared to CHEK-LOSS ® Coarse in a laboratory prepared 12 lb/gal SYN-TEQ ® fluid

| Materials: | | | | | | |
|---|---|---|---|---|---|---|
| Lab-Prepared Base Mud*, bbl | 1.0 | 1.0 | 1.0 | 1.0 | 1.0 | 1.0 |
| CHEK-LOSS ®, lb/bbl | — | 10 | — | — | — | — |
| CHEK-LOSS ® Coarse, lb/bbl | — | — | 10 | — | — | — |
| CHEK-LOSS ® Coarse Retsch ground**, lb/bbl | — | — | — | 10 | — | — |
| KWIK-SEAL ® Fine, lb/bbl | — | — | — | — | 10 | — |

TABLE 6-continued

PPA STUDY - Evaluation of KWIK-SEAL ® Fine compared to CHEK-LOSS ® Coarse in a laboratory prepared 12 lb/gal SYN-TEQ ® fluid

| | | | | | | |
|---|---|---|---|---|---|---|
| KWIK-SEAL ® Fine Retsch ground**, lb/bbl | — | — | — | — | — | 10 |
| Stirred 30 min | | | | | | |
| Rolled 16 hr, 150° F. | | | | | | |
| Properties: | | | | | | |
| Electrical stability, volt | 1000 | 440 | 600 | 475 | 750 | 700 |
| 600 rpm rdg, 120° F. | 113 | 120 | 114 | 118 | 94 | 112 |
| 300 rpm rdg | 73 | 75 | 76 | 75 | 60 | 70 |
| 200 rpm rdg | 58 | 59 | 60 | 59 | 45 | 53 |
| 100 rpm rdg | 40 | 42 | 43 | 43 | 32 | 36 |
| 6 rpm rdg | 17 | 17 | 17 | 17 | 14 | 15 |
| 3 rpm rdg | 15 | 15 | 15 | 15 | 12 | 13 |
| Plastic viscosity, cp | 40 | 45 | 38 | 43 | 34 | 42 |
| Yield point, lb/100 ft$^2$ | 33 | 30 | 38 | 32 | 26 | 28 |
| 10-sec gel, lb/100 ft$^2$ | 17 | 17 | 17 | 17 | 14 | 15 |
| 10-min gel, lb/100 ft$^2$ | 19 | 19 | 19 | 19 | 16 | 18 |
| PPA: (90-micron, 250° F.) | | | | | | |
| Initial spurt loss, ml | 4.2 | 3.0 | 3.0 | 3.4 | 2.8 | 3.2 |
| Total loss, ml | 8.2 | 5.8 | 6.6 | 7.0 | 5.6 | 4.8 |

Figure 1:
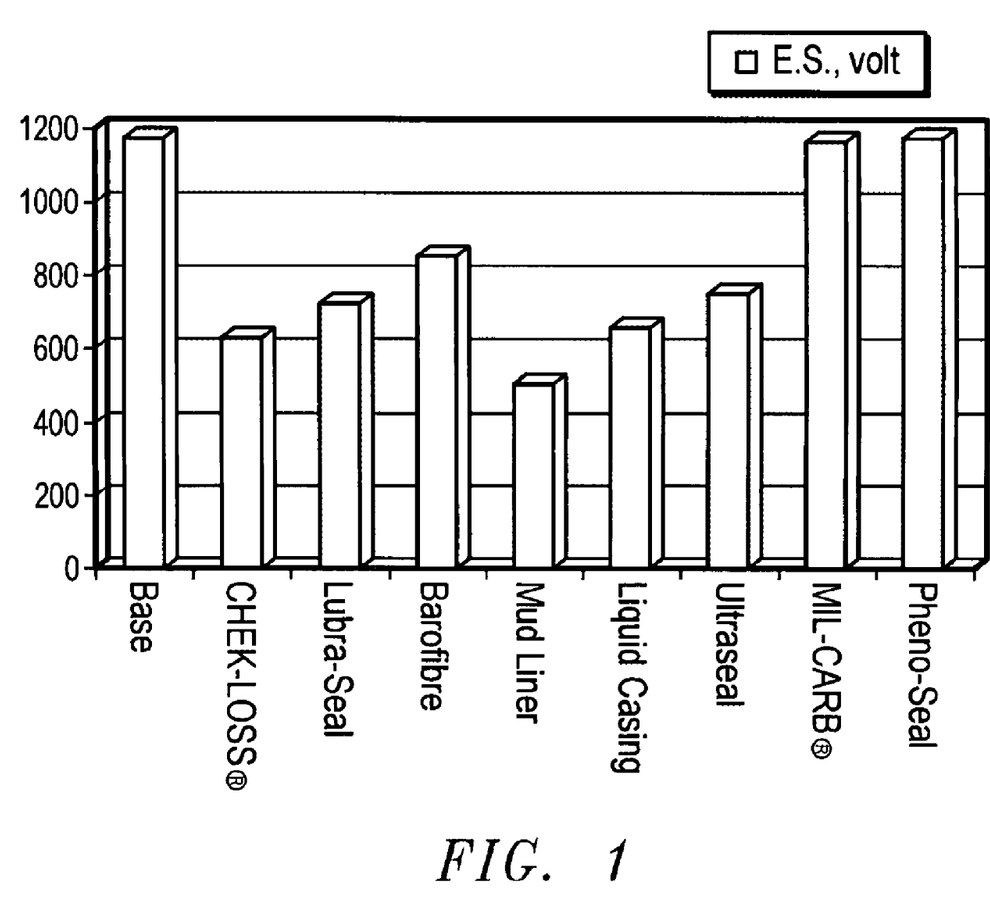
FIG. 1 is a graph showing comparative LCM effects upon electrical stability in a field ECO-FLOW sample.
Figure 2:
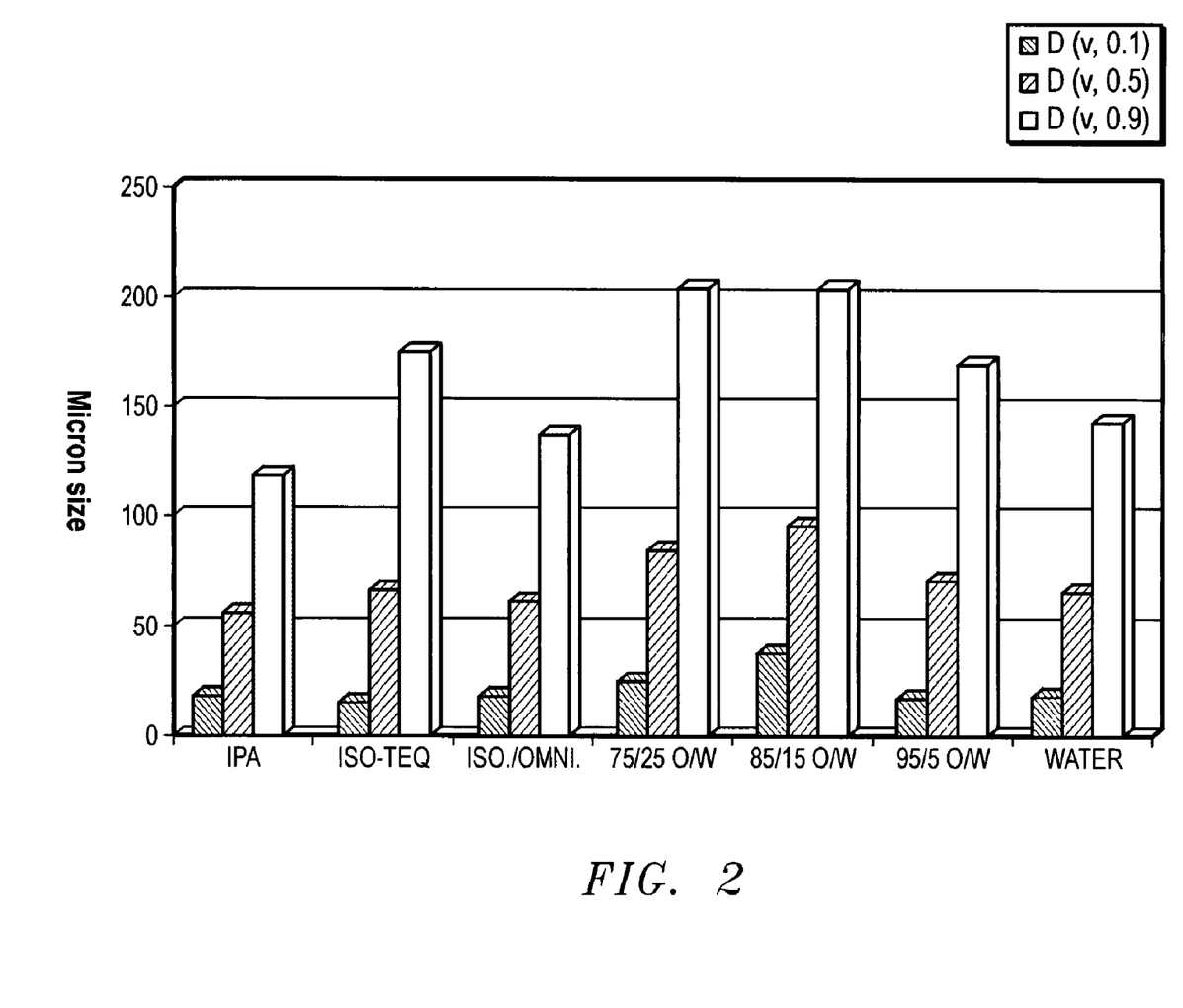
FIG. 2 is a graph showing a particle size distribution analyses of CHECK-LOSS® in various fluids.

Notes:
*Base mud composition: 0.629 bbl ISO-TEQ ®, 12 lb OMNI-MUL ®, 0.15 bbl water, 8 lb/bbl CARBO-GEL ®, 18 lb calcium chloride, 239 lb/bbl MIL-BAR ®
**LCM additives ground by Retsch apparatus From the foregoing, it was concluded that the intrinsic affinity of cellulosic fibers for water was the cause of the influence of these fibers on electrical stability. Decreased electrical stability values were attributable to swollen, hydrated fibers coming into contact with the electrical stability meter probe. The magnitude of the phenomenon was related to the amount of available water—i.e. the more water, the lower the value. Therefore, the reduction in electrical stability increased as oil/water ratios decreased. Water wetting of solids was never observed in the test fluids. The bar chart of FIG. 1 summarizes the variety of LCM effects upon electrical stability. Particulate LCMs such as MIL-CARB® had no effect. Mud property data is presented in the foregoing Tables, and in FIG. 2.

The following are oil mud evaluations detailing routine analytical results of submitted field mud samples used in the test matrices.

TABLE 7

Sample: A
Sample Used For: Drilling
Mud System: Syn-Teq
Depth taken, feet: 14800

| | | | |
|---|---|---|---|
| External Phase-Oil: | Iso-Teq | S G, Weight Material: | 4.2 |
| Mud Weight, lbm/gal: | 17.1 | Density of Oil, lbm/gal: | 6.6 |
| Specific Gravity of Mud: | 2.05 | Excess Lime, lbm/bbl | 1.04 |
| Rheologies @, ° F.: | 150 | Total Calcium, mg/L mud | 12000 |
| 600 rpm: | 98 | Total Chlorides, mg/L mud | 26000 |
| 300 rpm: | 58 | CaCl2, mg/L mud | 40820 |
| 200 rpm: | 44 | CaCl2, lbm/bbl of mud | 14.29 |
| 100 rpm: | 28 | CaCl2, mg/L | 402,797 |
| 6 rpm: | 8 | CaCl2, % by weight | 31.2 |
| 3 rpm: | 7 | Brine Density, g/ml | 1.29 |
| Plastic Viscosity, cPs: | 40 | Corrected Brine, % by vol. | 10.1 |
| Yield Point, lbf/100 ft$^2$: | 18 | Corrected Solids, % by vol. | 38.9 |
| Initial Gel, lbf/100 ft$^2$: | 9 | Average Solids Density, g/ml | 3.90 |
| 10 min Gel, lbf/100 ft$^2$: | 12 | Weight Material, % by vol. | 31.3 |
| 30 min Gel, lbf/100 ft$^2$ | 13 | Weight Material, lbm/bbl | 460.0 |
| API, mls/30 mins: | | Low Gravity Solids, % by vol. | 7.6 |
| HT-HP Temp, ° F.: | 300 | Low Gravity Solids, lbm/bbl | 70.3 |
| HT-HP, mls/30 mins: | 2.2 | Oil:Water Ratio = Water | 15.0 |
| Pom, mls/1 ml mud: | 0.8 | Oil:Water Ratio = Oil | 85.0 |
| AgN03, mls/1 ml mud: | 2.6 | Corrected Water Ratio | 16.6 |
| EDTA, mls/1 ml mud: | 3 | Corrected Oil Ratio | 83.4 |
| ES, volts: | 1200 | | |
| Solids, % by vol.: | 40 | | |
| Water, % by vol.: | 9 | | |
| Oil, % by vol.: | 51 | | |

TABLE 8

Sample: E
Sample Used For: Drilling
Mud System: ECOFLOW 200
Depth taken, feet:

| | | | |
|---|---|---|---|
| External Phase-Oil: | Ecoflow | S G, Weight Material: | 4.2 |
| Mud Weight, lbm/gal: | 16.6 | Density of Oil, lbm/gal: | 6.6 |
| Specific Gravity of Mud: | 2.00 | Excess Lime, lbm/bbl | 3.51 |
| Rheologies @, ° F.: | 150 | Total Calcium, mg/L mud | 11200 |
| 600 rpm: | 82 | Total Chlorides, mg/L mud | 24000 |
| 300 rpm: | 47 | CaCl2, mg/L mud | 37680 |
| 200 rpm: | 35 | CaCl2, lbm/bbl of mud | 13.19 |
| 100 rpm: | 22 | CaCl2, mg/L | 530,455 |
| 6 rpm: | 6 | CaCl2, % by weight | 38.6 |
| 3 rpm: | 5 | Brine Density, g/ml | 1.38 |
| Plastic Viscosity, cPs: | 35 | Corrected Brine, % by vol. | 7.1 |
| Yield Point, lbf/100 ft$^2$: | 12 | Corrected Solids, % by vol. | 39.9 |
| Initial Gel, lbf/100 ft$^2$: | 7 | Average Solids Density, g/ml | 3.71 |
| 10 min Gel, lbf/100 ft$^2$: | 11 | Weight Material, % by vol. | 27.2 |
| 30 min Gel, lbf/100 ft$^2$ | 11 | Weight Material, lbm/bbl | 399.4 |
| API, mls/30 mins: | | Low Gravity Solids, % by vol. | 12.7 |
| HT-HP Temp, ° F.: | | Low Gravity Solids, lbm/bbl | 118.1 |
| HT-HP, mls/30 mins: | | Oil:Water Ratio = Water | 10.2 |
| Pom, mls/1 ml mud: | 2.7 | Oil:Water Ratio = Oil | 89.8 |
| AgN03, mls/1 ml mud: | 2.4 | Corrected Water Ratio | 11.8 |
| EDTA, mls/1 ml mud: | 2.8 | Corrected Oil Ratio | 88.2 |
| ES, volts: | 1360 | | |
| Solids, % by vol.: | 41 | | |
| Water, % by vol.: | 6 | | |
| Oil, % by vol.: | 53 | | |

TABLE 9

Sample Number: E
Sample Used For: Drilling
Mud System: Syn-Teq
Depth taken, feet:

| | | | |
|---|---|---|---|
| External Phase-Oil: | Eco-Flow 200 | S G, Weight Material: | 4.2 |
| Mud Weight, lbm/gal: | 17.0 | Density of Oil, lbm/gal: | 6.5 |
| Specific Gravity of Mud: | 2.04 | Excess Lime, lbm/bbl | 5.46 |
| Rheologies @, ° F.: | 150 | Total Calcium, mg/L mud | 14800 |
| 600 rpm: | 89 | Total Chlorides, mg/L mud | 30000 |
| 300 rpm: | 52 | CaCl2, mg/L mud | 47100 |
| 200 rpm: | 38 | CaCl2, lbm/bbl of mud | 16.48 |
| 100 rpm: | 25 | CaCl2, mg/L | 530,455 |
| 6 rpm: | 7 | CaCl2, % by weight | 38.6 |
| 3 rpm: | 6 | Brine Density, g/ml | 1.38 |
| Plastic Viscosity, cPs: | 37 | Corrected Brine, % by vol. | 8.9 |
| Yield Point, lbf/100 ft$^2$: | 15 | Corrected Solids, % by vol. | 38.1 |
| Initial Gel, lbf/100 ft$^2$: | 8 | Average Solids Density, g/ml | 3.94 |
| 10 min Gel, lbf/100 ft$^2$: | 12 | Weight Material, % by vol. | 31.7 |
| 30 min Gel, lbf/100 ft$^2$ | 13 | Weight Material, lbm/bbl | 466.6 |
| API, mls/30 mins: | | Low Gravity Solids, % by vol. | 6.4 |
| HT-HP Temp, ° F.: | 300 | Low Gravity Solids, lbm/bbl | 59.1 |
| HT-HP, mls/30 mins: | 2 | Oil:Water Ratio = Water | 12.4 |
| Pom, mls/1 ml mud: | 4.2 | Oil:Water Ratio = Oil | 87.6 |
| AgN03, mls/1 ml mud: | 3 | Corrected Water Ratio | 14.3 |
| EDTA, mls/1 ml mud: | 3.7 | Corrected Oil Ratio | 85.7 |
| ES, volts: | 1420 | | |
| Solids, % by vol.: | 39.5 | | |
| Water, % by vol.: | 7.5 | | |
| Oil, % by vol.: | 53 | | |

EXAMPLE 2

The following LCM's were obtained from Grinding & Sizing Co. labeled as: "Wood Fiber" (pine), "Grape Pumice", "Pith", "Furfural" and "Total Control" (ground rubber). Ground coconut shell was obtained from Reade Co. in 325 mesh size and 80-325 mesh size ("Reade 325F" and "Reade 325/80," respectively).

Equipment
1. Prince Castle mixer
2. Fann viscometer, Model 35A
3. Thermometer, dial, 0-220° F.
4. Balance with precision of 0.01 g
5. Sieves (conforming to ASTM E11 requirements)
6. Roller oven, 150-250±5° F. (66-121±3° C.)
7. Spatula
8. Timer: interval, mechanical or electrical, precision of 0.1 minute
9. Jars (approximately 500 ml capacity) with sealing lids
10. Heating cup, OFI, 115 volt 11. Particle Plugging Apparatus
12. Aloxite disks
13. Malvern Mastersizer Procedures The Following INTEQ Fluids Laboratory Procedures were used:

Recommended Practice Standard Procedure for Field Testing Oil-Based Drilling Fluids, API Recommended Practice 13B-2, Third Edition, February 1998, incorporated herein by reference.

Recommended Practice Standard Procedure for Field Testing Water-Based Drilling Fluids, API Recommended Practice 13B-1, Second Edition, September 1997, incorporated herein by reference.

Instrumentation Manual for Malvern Mastersizer

The procedures described in Example 1 were repeated to determine electrical stability of the of samples before and after adding the fibrous lost circulation materials. The following results were observed:

TABLE 10

Evaluation of Various Fibrous LCM Additives from Grinding & Sizing Co., Inc., as compared to CHEK-LOSS

| Materials: | | | | | | | |
|---|---|---|---|---|---|---|---|
| Field Mud FSR No. 4502, bbl | 1.0 | 1.0 | 1.0 | 1.0 | 1.0 | 1.0 | 1.0 |
| CHEK-LOSS, lb | — | 10 | — | — | — | — | — |
| Wood Fiber, lb | — | — | 10 | — | — | — | — |
| Grape Pumice, lb | — | — | — | 10 | — | — | — |
| Pith, lb | — | — | — | — | 10 | — | — |
| Furfural, lb | — | — | — | — | — | 10 | — |
| Total Control, lb | — | — | — | — | — | — | 10 |
| Stirred 15 min; rolled 16 hr, 150° F. | | | | | | | |
| Properties: | | | | | | | |
| 600 rpm rdg at 120° F. | 91 | 119 | 114 | 100 | 108 | 108 | 107 |
| 300 rpm rdg | 52 | 69 | 66 | 60 | 64 | 64 | 63 |
| 200 rpm rdg | 38 | 51 | 48 | 44 | 47 | 47 | 46 |
| 100 rpm rdg | 24 | 31 | 30 | 28 | 30 | 30 | 28 |
| 6 rpm rdg | 7 | 8 | 8 | 8 | 8 | 8 | 8 |
| 3 rpm rdg | 5 | 6 | 6 | 6 | 6 | 6 | 6 |
| Plastic viscosity, cp | 39 | 50 | 48 | 40 | 44 | 44 | 44 |
| Yield point, lb/100 sq ft | 13 | 19 | 18 | 20 | 20 | 20 | 19 |
| 10-sec gel, lb/100 sq ft | 8 | 9 | 9 | 9 | 9 | 9 | 9 |
| 10-min gel, lb/100 sq ft | 11 | 12 | 12 | 12 | 12 | 12 | 12 |
| Electrical stability, volt | 750 | 300 | 350 | 670 | 540 | 490 | 590 |
| Pom, mls/1 ml mud | 1.6 | 1.55 | — | 1.55 | — | — | — |
| Particle plugging apparatus results, (300° F., 1000 psi, 90-micron) | | | | | | | |
| Spurt loss, ml | 3.0 | 4.8 | — | 2.0 | — | — | — |
| Final total loss, ml | 5.0 | 7.2 | — | 2.8 | — | — | — |

| Oil-Mud Sample Evaluation Report (FSR No. 4502) | | | |
|---|---|---|---|
| External Phase-Oil: | Ecoflow | S G, Weight Material: | 4.2 |
| Mud Weight, lbm/gal: | 15.3 | Density of Oil, lbm/gal: | 6.6 |
| Specific Gravity of Mud: | 1.84 | Excess Lime, lbm/bbl | 1.95 |
| Rheological Properties, ° F.: | 150 | Total Calcium, mg/L mud | 10400 |
| 600 rpm: | 60 | Total Chlorides, mg/L mud | 22000 |
| 300 rpm: | 35 | CaCl2, mg/L mud | 34540 |
| 200 rpm: | 26 | CaCl2, lbm/bbl of mud | 12.09 |
| 100 rpm: | 17 | CaCl2, mg/L | 347,539 |
| 6 rpm: | 5 | CaCl2, % by weight | 27.7 |
| 3 rpm: | 4 | Brine Density, g/ml | 1.25 |
| Plastic Viscosity, cPs: | 25 | Corrected Brine, % by vol. | 9.9 |
| Yield Point, lbf/100 ft$^2$: | 10 | Corrected Solids, % by vol. | 35.1 |
| Initial Gel, lbf/100 ft$^2$: | 7 | Average Solids Density, g/ml | 3.65 |
| 10 min Gel, lbf/100 ft$^2$: | 10 | Weight Material, % by vol. | 22.6 |
| 30 min Gel, lbf/100 ft$^2$ | 10 | Weight Material, lbm/bbl | 331.5 |
| API, mls/30 mins: | | Low Gravity Solids, % by vol. | 12.5 |
| HT-HP Temp, ° F.: | | Low Gravity Solids, lbm/bbl | 116.0 |
| HT-HP, mls/30 mins: | | Oil:Water Ratio = Water | 14.1 |
| Pom, mls/1 ml mud: | 1.5 | Oil:Water Ratio = Oil | 85.9 |
| AgN03, mls/1 ml mud: | 2.2 | Corrected Water Ratio | 15.3 |
| EDTA, mls/1 ml mud: | 2.6 | Corrected Oil Ratio | 84.7 |
| ES, volts: | 700 | | |
| Solids, % by vol.: | 36 | | |
| Water, % by vol.: | 9 | | |
| Oil, % by vol.: | 55 | | |

TABLE 11

Evaluation of Grinding & Sizing Co. Grape Pumice, as compared to CHEK-LOSS, in a Solids-Laden Oil-Based Field Mud

| Materials: | | | |
|---|---|---|---|
| Field Mud (FSR No. 4522), bbl | 1.0 | 1.0 | 1.0 |
| CHEK-LOSS, lb | — | 10 | — |
| Grape Pumice, lb | — | — | 10 |
| Stirred 15 min; rolled 16 hr, 150° F. Properties: | | | |
| 600 rpm rdg at 120° F. | 150 | 190 | 150 |
| 300 rpm rdg | 81 | 104 | 80 |
| 200 rpm rdg | 58 | 72 | 56 |
| 100 rpm rdg | 32 | 42 | 31 |
| 6 rpm rdg | 5 | 7 | 5 |
| 3 rpm rdg | 4 | 5 | 4 |
| Plastic viscosity, cp | 69 | 86 | 70 |
| Yield point, lb/100 sq ft | 12 | 18 | 10 |
| 10-sec gel, lb/100 sq ft | 7 | 8 | 7 |
| 10-min gel, lb/100 sq ft | 23 | 27 | 24 |
| Electrical stability, volt | 620 | 350 | 585 |
| Pom, mls/1 ml mud | 1.0 | 1.0 | 1.0 |
| Particle plugging apparatus results, (300° F., 1000 psi, 90-micron) | | | |
| Spurt loss, ml | 4.6 | 5.2 | 2.8 |
| Final total loss, ml | 9.0 | 9.6 | 5.2 |

TABLE 12

Evaluation of Reade Co. Ground Coconut Shell, as compared to CHEK-LOSS, in a Solids-Laden Oil-Based Field Mud

| Materials: | | | | |
|---|---|---|---|---|
| Field Mud (FSR No. 4522), bbl | 1.0 | 1.0 | 1.0 | 1.0 |
| CHEK-LOSS, lb | — | 10 | — | — |
| Reade 325F, lb | — | — | 10 | — |
| Reade 80/325, lb | — | — | — | 10 |
| Stirred 15 min; rolled 16 hr, 150° F. Properties: | | | | |
| 600 rpm rdg at 120° F. | 150 | 190 | 173 | 185 |
| 300 rpm rdg | 81 | 104 | 97 | 102 |
| 200 rpm rdg | 58 | 72 | 72 | 75 |
| 100 rpm rdg | 32 | 42 | 41 | 42 |
| 6 rpm rdg | 5 | 7 | 8 | 6 |
| 3 rpm rdg | 4 | 5 | 6 | 4 |
| Plastic viscosity, cp | 69 | 86 | 76 | 83 |
| Yield point, lb/100 sq ft | 12 | 18 | 21 | 19 |
| 10-sec gel, lb/100 sq ft | 7 | 8 | 11 | 11 |
| 10-min gel, lb/100 sq ft | 23 | 27 | 48 | 40 |
| Electrical stability, volt | 620 | 350 | 605 | 585 |
| Pom, mls/1 ml mud | 1.0 | 1.0 | — | 0.95 |
| Particle plugging apparatus results, (300° F., 1000 psi, 90-micron) | | | | |
| Spurt loss, ml | 4.6 | 5.2 | — | 3.4 |
| Final total loss, ml | 9.0 | 9.6 | — | 6.6 |

The coconut materials had very minimal impact upon the electrical stability value of the base fluid. However, these materials appeared to be kilned, thus making them more characteristic as a particulate rather than a fiber. Resultant Theological properties were not satisfactory.

In Data Tables 11 and 12, Formula 4522 was the following:

| Oil-Mud Sample Evaluation Report (FSR No. 4522) | | | |
|---|---|---|---|
| External Phase-Oil: | Diesel | S G, Weight Material: | 4.2 |
| Mud Weight, lbm/gal: | 16.5 | Density of Oil, lbm/gal: | 7.1 |
| Specific Gravity of Mud: | 1.98 | Excess Lime, lbm/bbl | 1.30 |
| Rheological Properties, ° F.: | 150, 120 | Total Calcium, mg/L mud | 5200 |
| 600 rpm: | 96, 137 | Total Chlorides, mg/L mud | 9000 |
| 300 rpm: | 52, 75 | CaCl2, mg/L mud | 14130 |
| 200 rpm: | 36, 52 | CaCl2, lbm/bbl of mud | 4.95 |
| 100 rpm: | 21, 29 | CaCl2, mg/L | 150,804 |
| 6 rpm: | 4, 5 | CaCl2, % by weight | 13.6 |
| 3 rpm: | 3, 4 | Brine Density, g/ml | 1.11 |

-continued

| Oil-Mud Sample Evaluation Report (FSR No. 4522) | | | |
|---|---|---|---|
| Plastic Viscosity, cPs: | 44, 62 | Corrected Brine, % by vol. | 9.4 |
| Yield Point, lbf/100 ft$^2$: | 8, 13 | Corrected Solids, % by vol. | 39.1 |
| Initial Gel, lbf/100 ft$^2$: | 5, 6 | Average Solids Density, g/ml | 3.67 |
| 10 min Gel, lbf/100 ft$^2$: | 21, 22 | Weight Material, % by vol. | 25.7 |
| 30 min Gel, lbf/100 ft$^2$ | 29, 30 | Weight Material, lbm/bbl | 377.4 |
| API, mls/30 mins: | | Low Gravity Solids, % by vol. | 13.5 |
| HT-HP Temp, ° F.: | 300 | Low Gravity Solids, lbm/bbl | 124.8 |
| HT-HP, mls/30 mins: | 9.2 | Oil:Water Ratio = Water | 14.9 |
| Pom, mls/1 ml mud: | 1 | Oil:Water Ratio = Oil | 85.1 |
| AgNO3, mls/1 ml mud: | 0.9 | Corrected Water Ratio | 15.4 |
| EDTA, mls/1 ml mud: | 1.3 | Corrected Oil Ratio | 84.6 |
| ES, volts: | 650 | | |
| Solids, % by vol.: | 39.5 | | |
| Water, % by vol.: | 9 | | |
| Oil, % by vol.: | 51.5 | | |

TABLE 13

Evaluation of Grinding & Sizing Co. Grape Pumice, as compared to CHEK-LOSS, in a Laboratory-Prepared Water-Based Mud

| Materials: | | | |
|---|---|---|---|
| Lab-Prepared Mud (FSR No. 4423b), bbl | 1.0 | 1.0 | 1.0 |
| CHEK-LOSS, lb | — | 10 | — |
| Grape Pumice, lb | — | — | 10 |
| Stirred 15 min; rolled 16 hr, 150° F. | | | |
| Properties: | | | |
| 600 rpm rdg at 120° F. | 74 | 141 | 90 |
| 300 rpm rdg | 40 | 80 | 52 |
| 200 rpm rdg | 28 | 57 | 40 |
| 100 rpm rdg | 17 | 35 | 25 |
| 6 rpm rdg | 3 | 9 | 8 |
| 3 rpm rdg | 2 | 7 | 6 |
| Plastic viscosity, cp | 24 | 61 | 38 |
| Yield point, lb/100 sq ft | 16 | 19 | 14 |
| 10-sec gel, lb/100 sq ft | 6 | 14 | 14 |
| 10-min gel, lb/100 sq ft | 23 | 38 | 44 |
| pH | 9.0 | 8.4 | 7.5 |
| API filtrate, ml | 0.6 | 0.4 | 0.4 |

In Data Table 13, Formulation 4423b was the following:

| Formulation (FSR 4423b) | |
|---|---|
| Water, bbl | 0.6 |
| MILGEL, lb | 4.0 |
| Soda Ash, lb | 1.0 |
| NEW-DRILL LV, lb | 0.5 |
| Sea salt, lb | 8.8 |
| MIL-PAC LV, lb | 1.0 |
| CHEMTROL X, lb | 6.0 |
| LIGCO, lb | 6.0 |
| TEQ-THIN, lb | 3.0 |
| SULFATROL, lb | 2.0 |
| Caustic Soda, lb | 2.5 |
| AQUA-MAGIC, % vol | 3.0 |
| ALL-TEMP, lb | 1.0 |
| Rev Dust, lb | 18.0 |
| MIL-BAR, lb | 450.0 |
| MIL-CARB, lb | 10.0 |
| CHECK-LOSS, lb | 3.0 |

Grape Pumice appears to fulfill the needed characteristic of being composed of more lignin rather than cellulose. Grape Pumice caused significantly less impact (5-10% decreases) upon electrical stability values, as compared to 50-60% decreases when adding CHEK-LOSS. Grape Pumice also induced less impact upon the plastic viscosities of the oil muds, as compared to CHEK-LOSS. Grape Pumice provided better PPA (particle plugging apparatus) results, as compared to CHEK-LOSS at test conditions of 300° F., 1000 psi differential, 90-micron aloxite disk.

EXAMPLE 3

The papermaking industry uses a measurement called the Water Retention Value (WRV), which gives the amount of water intimately associated with a given dry weight of wood pulp. This represents the capacity of fibers to swell in the presence of water. This value varies with the source of plant fibers (corn, peanut, walnut, almond, coconut, etc.). The paper industry wants more cellulose, less lignin. The need in this application is to choose a plant fiber source with a ratio of more lignin with less cellulose. Lignin, which serves as the "skeletal" structure for plants, is significantly less water-absorbent.

The following described procedure is a modification of the TAPPI 1991 UM-256 procedure used in the papermaking industry. Equipment used included:

1. Prince Castle mixer
2. Tachometer
3. 500-ml glass jars with lids
4. Deionized water
5. Electronic balance
6. Vacuum pump
7. 2-liter Erlenmeyer flask
8. Buchner funnel
9. Whatman filter paper No. 41

An amount of 25 g test material was added to a glass jar. 250 ml of deionized water was then added. The slurry was sheared at 3000 rpm for 5 min. The glass jar was capped and rolled 16 hr at 150° F. After cooling, the jar contents was poured into an assembled Buchner funnel (using Whatman filter paper No. 41) fitted on a 2-liter Erlenmeyer flask, hooked to a vacuum pump. Filtration was conducted for two hours maximum. The Buchner funnel with test material content was removed from the flask and was weighed. Calculation of the WRV would be as follows:

(Buchner funnel with filter paper and retained wet test material minus Buchner funnel with wet paper) minus initial 25 g dry test material. Resultant value then divided by initial 25 g dry test material.

Results were, as follows:

| Test Material | Weight, g | Weight of filtered, wet Material, g | WRV |
|---|---|---|---|
| Buchner funnel with wet paper | 602.2 | — | — |
| Above with MIL-CARB | 630.8 | 28.6 | 0.144 |
| Above with Grape Pumice | 633.6 | 31.4 | 0.256 |
| Above with CHEK-LOSS | 727.8 | 125.6 | 4.024 |
| Above with Mud-Liner | 745.0 | 142.8 | 4.712 |
| Above with Liquid Casing | 715.0 | 112.8 | 3.512 |

The Grape Pumice material appears to fulfill the needed characteristic of being composed of more lignin rather than cellulose.

Particle size analyses by Malvern Mastersizer instrumentation showed the Grape Pumice to be near-similar to CHEK-LOSS:

| Test Material | D (v, 0.1) | D (v, 0.5) | D (v, 0.9) |
|---|---|---|---|
| Grape Pumice | 16 µm | 69 µm | 166 µm |
| CHEK-LOSS | 21 µm | 68 µm | 185 µm |

As evident by this data, particle size distribution would not contribute to differentiating WRV between the two materials; Grape Pumice exhibits significantly less water absorbency, a characteristic favorable for application as a LCM in invert emulsion drilling fluids while not interfering with emulsion stability measurements.

EXAMPLE 4

The Grape Pumice material, being acidic, will lower pH levels in aqueous muds. A test was conducted by adding 10 lb Grape Pumice to a 1-bbl equivalent of deionized water. Resultant pH was 3.5. Blending 10 lb Grape Pumice with 0.2 lb soda ash kept the pH at 7.0.

Because of this concern, alkalinity levels were measured in the oil muds tested with Grape Pumice. There were no changes, thus the Grape Pumice seems to be preferentially oil-wetted.

Persons of ordinary skill in the art will recognize that many modifications may be made to the embodiments described herein. The embodiments described herein are meant to be illustrative only and should not be taken as limiting the invention, which will be defined in the claims.

I claim:

1. A process for minimizing breaking of an emulsion type drilling fluid system comprising one or more fibrous lost circulation material, the process comprising:
   measuring an initial voltage reading for the emulsion type drilling fluid system in the absence of the one or more fibrous lost circulation material;
   forming a mixture comprising an initial weight of a given fibrous lost circulation material and a volume of water sufficient to hydrate the initial weight of the given fibrous lost circulation material;
   subjecting the mixture to conditions effective to produce a slurry comprising free water and the given fibrous lost circulation material comprising retained water;
   separating free water from the slurry, leaving the given fibrous lost circulation material comprising retained water;
   calculating the water retention value of the given fibrous lost circulation material by subtracting (a) the initial weight of the given fibrous lost circulation material, from (b) the weight of the given lost circulation material comprising the retained water;
   formulating a stable emulsion type drilling fluid system comprising fibrous lost circulation material consisting of one or more given fibrous lost circulation material having a water retention value of about 1 or less;
   performing drilling operations using the stable emulsion type drilling fluid system; and,
   maintaining a voltage reading for the stable emulsion type drilling fluid system during the drilling operations that is within 20% of the initial voltage reading.

2. The process of claim 1 comprising formulating the stable emulsion type drilling fluid system to comprise fibrous lost circulation material consisting of one or more given fibrous lost circulation material having a water retention value of about 0.5 or less.

3. The process of claim 1 comprising formulating the stable emulsion type drilling fluid system to comprise fibrous lost circulation material consisting of one or more given fibrous lost circulation material having a water retention value of about 0.3 or less.

4. The process of claim 1 comprising maintaining the voltage reading for the stable emulsion type drilling fluid system during the drilling operations within 18% of the initial voltage reading.

5. The process of claim 4 comprising formulating the stable invert emulsion type drilling fluid system to comprise fibrous lost circulation material consisting of one or more given fibrous lost circulation material having a water retention value, of about 0.5 or less.

6. The process of claim 1 comprising maintaining the voltage reading for the stable emulsion type drilling fluid system during the drilling operations within 15% of the initial voltage reading.

7. The process of claim 1 comprising maintaining the voltage reading for the stable emulsion type drilling fluid system during the drilling operations within 12% of the initial voltage reading.

8. A process for minimizing breaking of an invert emulsion type drilling fluid system comprising one or more fibrous lost circulation material, the process comprising:
   measuring an initial voltage reading for the invert emulsion type drilling fluid system in the absence of the one or more fibrous lost circulation material;
   forming a mixture comprising an initial weight of a given fibrous lost circulation material and a volume of water sufficient to hydrate the initial weight of the given fibrous lost circulation material;
   subjecting the mixture to conditions effective to produce a slurry comprising free water and the given fibrous lost circulation material comprising retained water;
   separating free water from the slurry, leaving the given fibrous lost circulation material comprising retained water;
   calculating the water retention value of the given fibrous lost circulation material by subtracting (a) the initial weight of the given fibrous lost circulation material, from (b) the weight of the given lost circulation material comprising the retained water;
   formulating a stable invert emulsion type drilling fluid system comprising fibrous lost circulation material consisting of one or more given fibrous lost circulation material having a water retention value of about 1 or less;
   performing drilling operations using the stable invert emulsion type drilling fluid system; and,
   maintaining a voltage reading for the stable invert emulsion type drilling fluid system during the drilling operations that is within 20% of the initial voltage reading.

9. The process of claim 8 comprising formulating the stable invert emulsion type drilling fluid system to comprise fibrous lost circulation material consisting of one or more given fibrous lost circulation material having a water retention value of about 0.3 or less.

10. The process of claim 8 comprising maintaining the voltage reading for the stable invert emulsion type drilling fluid system during the drilling operations within 18% of the initial voltage reading.

11. The process of claim 8 comprising maintaining the voltage reading for the stable invert emulsion type drilling fluid system during the drilling operations within 15% of the initial voltage reading.

12. The process of claim 8 comprising maintaining the voltage reading for the stable invert emulsion type drilling fluid system during the drilling operations within 12% of the initial voltage reading.

13. A process for minimizing breaking of an emulsion type drilling fluid system in contact with a spotting pill comprising one or more fibrous lost circulation material, the process comprising:
measuring an initial voltage reading for the emulsion type drilling fluid system in the absence of the one or more fibrous lost circulation material;
forming a mixture comprising an initial weight of a given fibrous lost circulation material and a volume of water sufficient to hydrate the initial weight of the given fibrous lost circulation material;
subjecting the mixture to conditions effective to produce a slurry comprising free water and the given fibrous lost circulation material comprising retained water;
separating free water from the slurry, leaving the given fibrous lost circulation material comprising retained water;
calculating the water retention value of the given fibrous lost circulation material by subtracting (a) the initial weight of the given fibrous lost circulation material, from (b) the weight of the given lost circulation material comprising the retained water;
formulating the spotting pill comprising fibrous lost circulation material consisting of one or more given fibrous lost circulation material having a water retention value of about 1 or less;
performing drilling operations using the emulsion type drilling fluid system in contact with the spotting pill; and,
maintaining a voltage reading for the emulsion type drilling fluid system in contact with the spotting pill during the drilling operations that is within 20% of the initial voltage reading.

14. The process of claim 13 comprising formulating the spotting pill comprising fibrous lost circulation material consisting of one or more given fibrous lost circulation material having a water retention value of about 0.5 or less.

15. The process of claim 13 comprising formulating the spotting pill comprising fibrous lost circulation material consisting of one or more given fibrous lost circulation material having a water retention value of about 0.3 or less.

16. The process of claim 13 comprising maintaining the voltage reading for the emulsion type drilling fluid system in contact with the spotting pill during the drilling operations within 18% of the initial voltage reading.

17. The process of claim 13 comprising maintaining the voltage reading for the emulsion type drilling fluid system in contact with the spotting pill during the drilling operations within 15% of the initial voltage reading.

18. The process of claim 13 comprising maintaining the voltage reading for the emulsion type drilling fluid system in contact with the spotting pill during the drilling operations within 12% of the initial voltage reading.

19. A process for minimizing breaking of an invert emulsion type drilling fluid system in contact with a spotting pill comprising one or more fibrous lost circulation material, the process comprising:
measuring an initial voltage reading for the invert emulsion type drilling fluid system in the absence of the one or more fibrous lost circulation material;
forming a mixture comprising an initial weight of a given fibrous lost circulation material and a volume of water sufficient to hydrate the initial weight of the given fibrous lost circulation material;
subjecting the mixture to conditions effective to produce a slurry comprising free water and the given fibrous lost circulation material comprising retained water;
separating free water from the slurry, leaving the given fibrous lost circulation material comprising retained water;
calculating the water retention value of the given fibrous lost circulation material by subtracting (a) the initial weight of the given fibrous lost circulation material, from (b) the weight of the given lost circulation material comprising the retained water;
formulating the spotting pill comprising fibrous lost circulation material consisting of one or more given fibrous lost circulation material having a water retention value of about 1 or less;
performing drilling operations using the invert emulsion type drilling fluid system in contact with the spotting pill; and,
maintaining a voltage reading for the invert emulsion type drilling fluid system in contact with the spotting pill during the drilling operations that is within 20% of the initial voltage reading.

20. The process of claim 19 comprising formulating the spotting pill comprising fibrous lost circulation material consisting of one or more given fibrous lost circulation material having a water retention value of about 0.5 or less.

21. The process of claim 19 comprising formulating the spotting pill comprising fibrous lost circulation material consisting of one or more given fibrous lost circulation material having a water retention value of about 0.3 or less.

22. The process of claim 19 comprising maintaining the voltage reading for the invert emulsion type drilling fluid system in contact with the spotting pill during the drilling operations within 18% of the initial voltage reading.

23. The process of claim 19 comprising maintaining the voltage reading for the invert emulsion type drilling fluid system in contact with the spotting pill during the drilling operations within 15% of the initial voltage reading.

24. The process of claim 19 comprising maintaining the voltage reading for the invert emulsion type drilling fluid system in contact with the spotting pill during the drilling operations within 12% of the initial voltage reading.

25. An emulsion type drilling fluid system having effective rheology and fluid loss control properties and comprising fibrous lost circulation material having a WRV of 1 or less derived from bulrush plants.

26. An invert emulsion type drilling fluid system having effective rheology and fluid loss control properties and comprising fibrous lost circulation material having a WRV of 1 or less derived from bulrush plants.

27. A spotting pill comprising carrier fluid and comprising fibrous lost circulation material having a WRV of 1 or less, the fibrous lost circulation material comprising material derived from bulrush plants.

* * * * *